United States Patent [19]
Lee

[11] Patent Number: 5,640,280
[45] Date of Patent: Jun. 17, 1997

[54] OBJECTIVE LENS DRIVING DEVICE FOR AN OPTICAL PICKUP

[75] Inventor: Keun-Jong Lee, Seoul, Rep. of Korea

[73] Assignee: Daewoo Electronics Co., Ltd., Seoul, Rep. of Korea

[21] Appl. No.: 560,359

[22] Filed: Nov. 17, 1995

[30] Foreign Application Priority Data

Nov. 17, 1994 [KR] Rep. of Korea .................. 94-30142

[51] Int. Cl.6 ............................................ G02B 7/02
[52] U.S. Cl. .................. 359/824; 369/44.15; 369/44.22; 359/814
[58] Field of Search ......................... 359/823, 824, 359/814; 369/44.15, 44.16, 247, 248, 44.22

[56] References Cited

U.S. PATENT DOCUMENTS

| | | | |
|---|---|---|---|
| 4,842,392 | 6/1989 | Nakamura et al. | 369/44.22 |
| 4,845,699 | 7/1989 | Kawasaki et al. | 369/44.22 |
| 5,144,607 | 9/1992 | Ishida et al. | 369/44.15 |
| 5,321,678 | 6/1994 | Takishima et al. | 369/44.16 |
| 5,414,563 | 5/1995 | Tanaka | 359/814 |

*Primary Examiner*—Loha Ben
*Attorney, Agent, or Firm*—Fish & Richardson P.C.

[57] ABSTRACT

The objective lens driving device for the optical pickup including the objective lens bobbin supported by a plurality of suspensions is disclosed. The objective lens driving device includes a plurality of pass holes formed on both sides of objective lens bobbin. Yokes are formed on the base plate opposite to the objective lens bobbin and have a plurality of fixed holes. Suspensions pass through and connect the holes of the yokes and objective lens bobbin, thereby supporting the objective lens bobbin.

8 Claims, 4 Drawing Sheets

OBJECTIVE LENS DRIVING DEVICE FOR AN OPTICAL PICKUP

BACKGROUND OF THE INVENTION

1. Field of the Invention

The present invention relates to an objective lens driving device for an optical pickup, and more particularly to an objective lens driving device in which a plurality of suspensions support an objective lens bobbin.

2. Description of the Prior Art

A light beam emitted from a built-in light source such as a semiconductor laser element is converged by an objective lens and other optical devices such as a collimator lens or a beam splitter on a signal recording surface of an optical disk as the optical recording medium. The light beam reflected by the signal previously recording surface is detected by a photo detector to produce the data signal recorded on the optical disk, or in which desired data signals are recorded by converging a light beam on the signal recording surface. With this type of optical pickup device, the objective lens for converging the light beam on the signal recording surface of the optical disk is movably supported in two directions orthogonal to each other, that is, in a direction along an optical axis (or in a focusing direction) and in a direction orthogonal to the optical axis (or in a tracking direction).

As an example of such the objective lens driving device, FIG. 1 is a perspective view of a conventional objective lens driving device which is similar to that disclosed in Japanese Utility Model Application No. 62-000787. Referring to FIG. 1, reference numeral 1 designates an objective lens opposed to an optical disc (not shown). The objective lens 101 is held by objective lens bobbin 102. The objective lens bobbin 102 is movably supported by four supporting rods 103 (hereinafter called suspensions) in the focusing direction and the tracking direction.

Each suspension 103 is made of elastic material such as rubber or elastomer. A focusing coil 106 is wound around a rectangular outer periphery of the objective lens bobbin 102, and tracking coil 107 is fixed to an outer periphery of the focusing coil 106. A pair of magnets 105 retained by yokes 108 are located outside the tracking coil 107 in such a manner as to be opposed to the focusing coil 106 and the tracking coil 107.

In the conventional objective lens driving device as mentioned above, the objective lens bobbin 102 is driven by the current flowing in the focusing coil 106 and magnetism of the magnets 105 to by that deform the suspensions 103 and affect the focusing control in a direction (f-direction) of an optical axis of the objective lens 101. In such a focusing control operation, a detected beam to be irradiated from the objective lens 101 onto an information recording surface of the optical disc is controlled to be focused on the recording surface.

Further, the objective lens bobbin 102 is driven by the current flowing in both side portions of tracking coil 107 and the magnetism of the magnets 105 to deform the suspensions 103 and affect the tracking control in a direction (t-direction) along the information recorded surface of the optical disc. In such a tracking controlling operation, a spot of the detected beam to be irradiated from the objective lens 101 onto the information recorded surface of the optical disc is controlled to precisely scan an information track of the recorded surface.

However, since the objective lens bobbin 102 is supported by the suspensions 103 made of elastic material such as rubber or elastomer, the suspensions 103 are subject to vibration occurred in driving the objective lens bobbin 102, and then the vibration of the suspensions 103 is transmitted to the objective lens bobbin 102.

The objective lens driving device which improves the above problem is disclosed in U.S. Pat. No. 5144607.

FIG. 2A is a perspective view of the other conventional objective lens driving device, and FIG. 2B is an exploded perspective view showing the objective lens driving device shown in FIG. 2A.

Referring to FIGS. 2A and 2B, the objective lens driving device includes an objective lens 201 supported by the objective lens bobbin 202, an objective lens supporting member 203 supporting the objective lens bobbin 202 for swinging movement, focusing coil 206 and tracking coil 207 mounted to the objective lens bobbin 202, magnets 205 mounted for facing the coil 206 and 207 and a magnetic yoke 204 supporting the magnets 205.

A coil housing section 209 is provided on both sides of the objective lens bobbin 202. The coil housing section 209 of the objective lens bobbin 202 is provided on both sides thereof with apertures 210 and the tracking coil 207 may be introduced into the coil housing section 209.

Thus, both tracking coils 207 are mounted to front and rear sides of the objective lens bobbin 201. The focusing coils 206 are mounted on the outer lateral sides of these tracking coil 207.

The objective lens supporting members 203, supporting the objective lens 201 for swinging movement in two directions at right angles with each other, is made from a thin metal sheet, such as a stainless steel sheet.

The objective lens bobbin 202 is supported by the objective lens supporting members 203 within the magnetic yoke 204 arranged as a rectangular frame so that the lens bobbin 202 faces the magnets 205 mounted within the magnetic yoke 204. The side walls of the magnetic yoke 204 are connected to one another such as by welding to complete a rectangular frame.

When the focusing driving current is supplied to the focusing coil 206, the objective lens bobbin 202 is driven so as to be deflected along the optical axis of the objective lens 201 shown by an arrow f in FIG. 2A, that is, in the focusing direction.

On the other hand, when the tracking driving current is supplied to the tracking coil 207, the objective lens bobbin 202 is driven so as to be deflected along the direction normal to the optical axis of the objective lens 201 shown by an arrow t in FIG. 2A, that is, in the tracking direction. However, as shown in FIG. 2A, construction of the above objective lens driving device is very complex. Therefore, the production cost of the objective lens driving device is high.

In addition, since the objective lens bobbin 202 is supported by the objective lens supporting member 203 made from stainless steel sheet, the objective lens supporting member 203 is subject to vibrations occurred in driving the objective lens bobbin 202, accordingly, the vibrations of the objective lens supporting members 203 can be transmitted to objective lens bobbin 202.

Accordingly, although the objective lens driving device showed in FIG. 2A has been improved over the prior art objective lens driving device shown in FIG. 1 (Japanese Utility Model Application No. 62-00787), the above driving devices cannot accurately do the focusing and the tracking controlling operations of the objective lens.

In addition, in order to drive the objective lens bobbins 102 and 202 along the focusing and the tracking directions in the objective lens bobbins, in the former, the suspensions 103 made of elastic member such as rubber or elastomer is deflected. In the latter, the objective lens supporting member 203 made from a stainless steel sheet is deflected. As a result, the objective lens driving devices will require a lot of driving current.

SUMMARY OF THE INVENTION

Accordingly, it is an object of the present invention to provide an objective lens driving device for an optical pickup in which the constitution if device is simple and the assembly is easily done.

It is another object of the present invention to provide the objective lens driving device for an optical pickup capable of controlling the focusing and the tracking operation accurately regardless of undesired vibrations.

It is still another object of the present invention to provide the objective lens driving device for optical pickup in which less current is required in focusing and tracking controlling operations.

For accomplishing the above objects, the present invention provides an objective lens driving device for optical pickup composing:

an objective lens bobbin including an objective lens having an optical axis and having a plurality of pass holes formed on both side walls of the objective lens bobbin, a plurality of suspensions for supporting the objective lens bobbin; and a base plate including a pair of yokes disposed on both sides of the base plate, the yokes being opposite each other and having a plurality of through holes on one yoke and a plurality of fixed holes on the other yoke to be connected with the plurality of suspensions, wherein the plurality of suspensions are fitted to the plurality of pass holes of the objective lens bobbin, thereby supporting the objective lens bobbin.

In the objective lens driving device for optical pickup according to the present invention, since the objective lens bobbin is supported by the plurality of suspensions, the device has become very simple in structure, and since a silicon gel in holes formed on the side walls of both yokes is filled, the vibration occurred in driving the objective lens bobbin is damped.

BRIEF DESCRIPTION OF THE DRAWING

The above objects and other advantages of the present invention will become more apparent by describing in detail a preferred embodiment thereof with reference to the attached drawings in which.

DETAILED DESCRIPTION OF THE PREFERRED EMBODIMENTS

Figure 1:
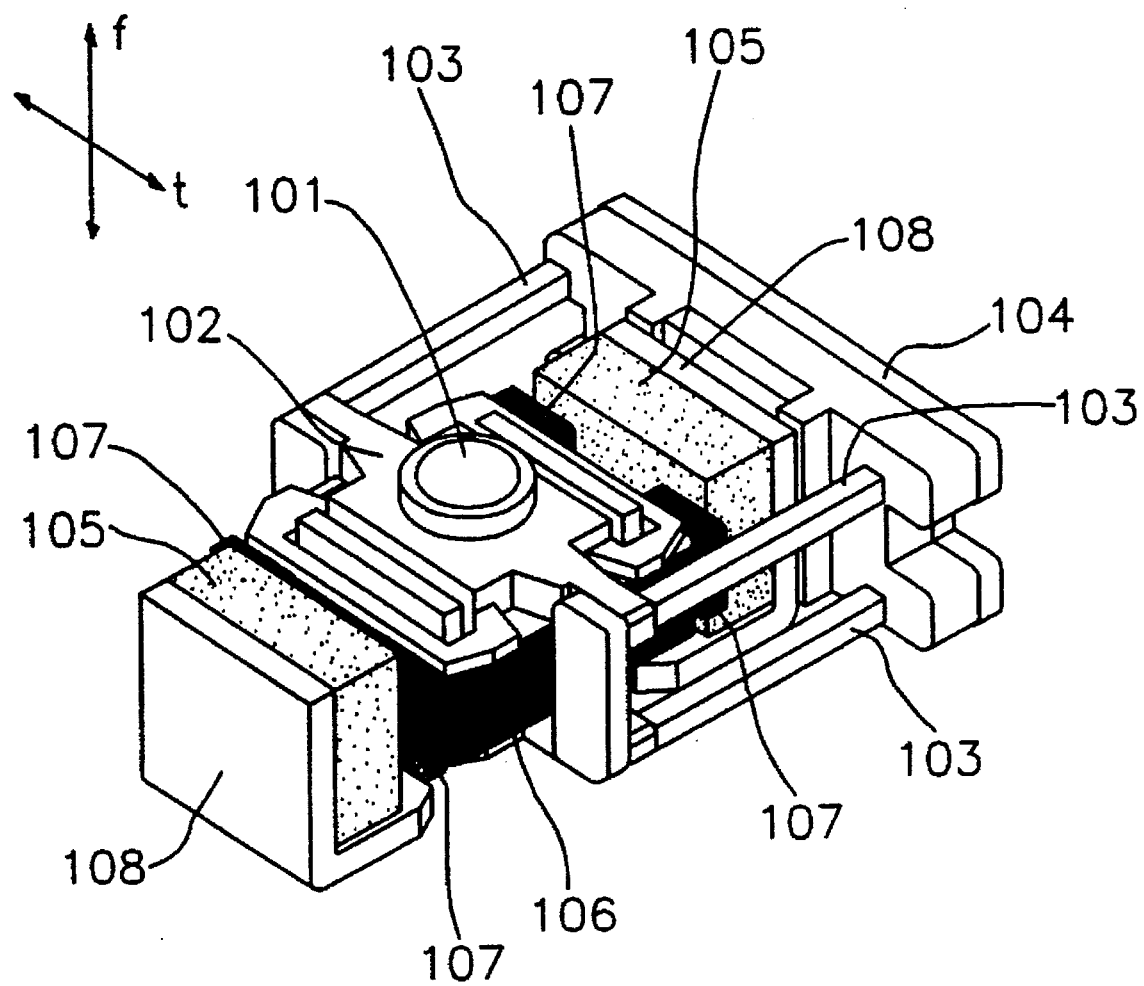
FIG. 1 is a perspective view showing a conventional objective lens device.
Figure 2A:
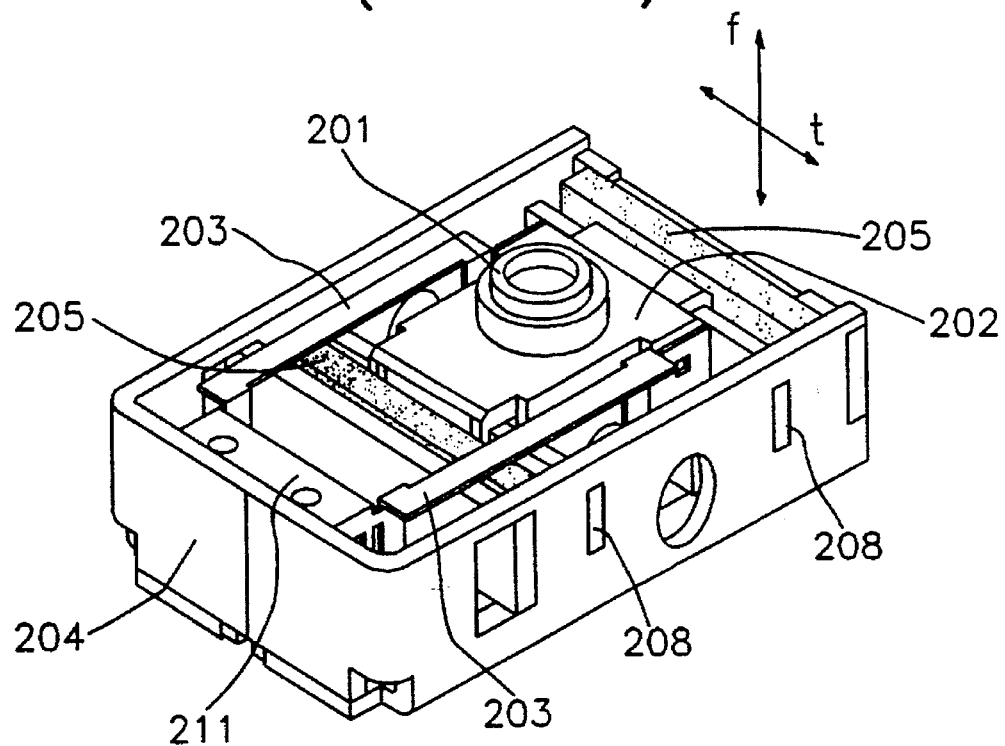
FIG. 2A is a perspective view showing the other conventional objective lens driving device.
Figure 2B:
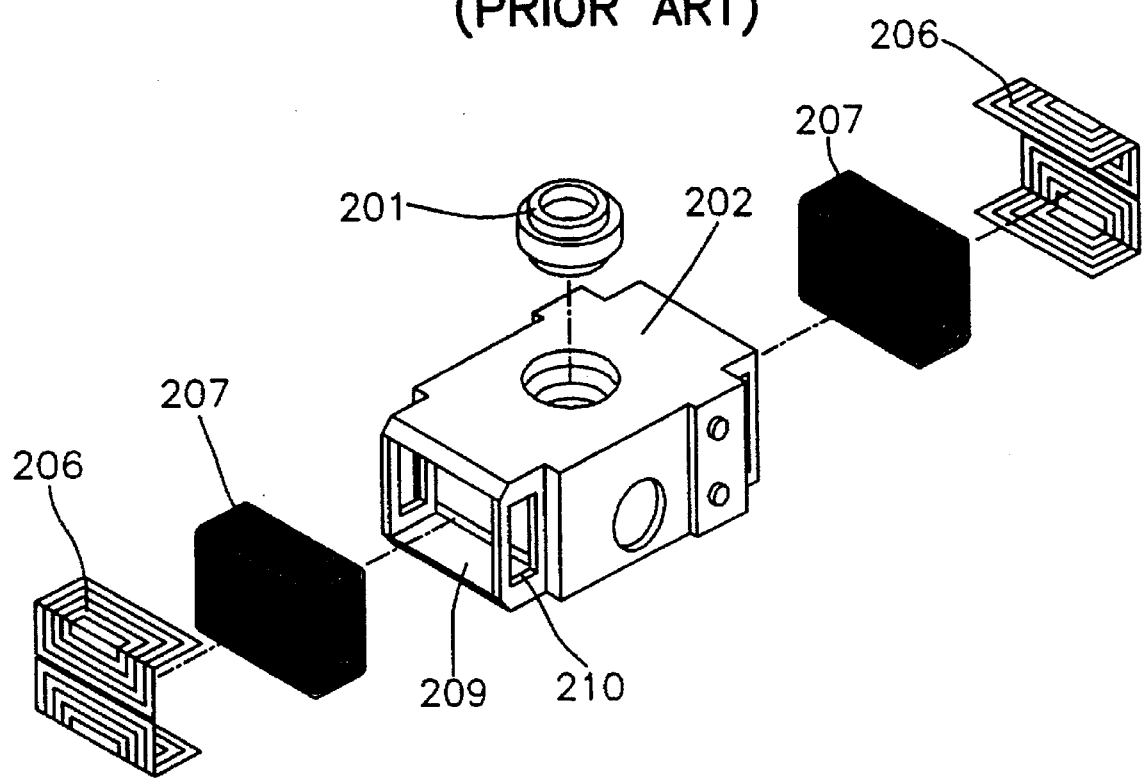
FIG. 2B is a perspective view showing the objective lens driving device shown in FIG. 2A.

Referring now to the drawings, there is shown an objective lens driving device for optical pickup according to the embodiment of the present invention in FIG. 3 and FIG. 4A to FIG. 4C.

Figure 3:
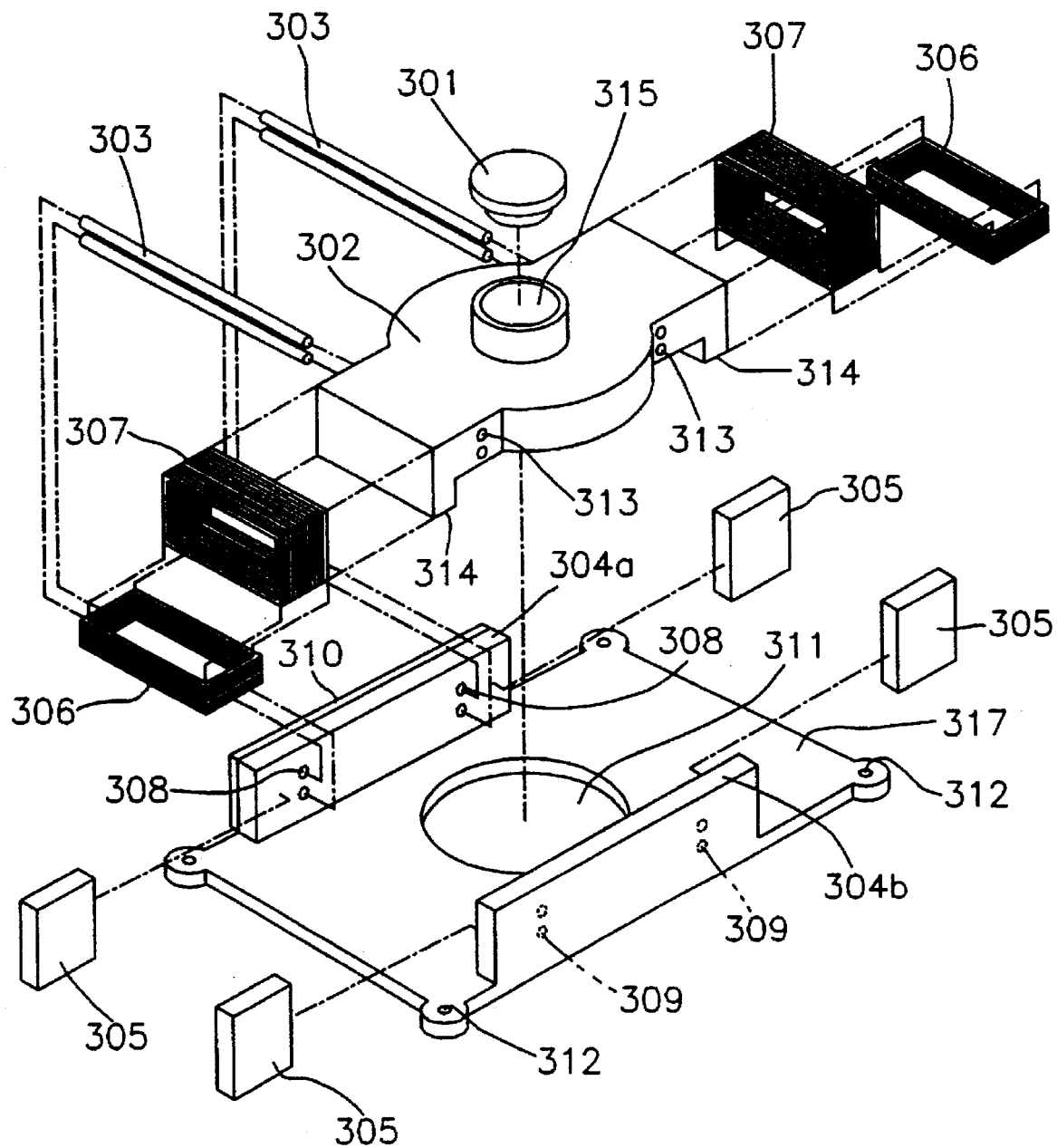
FIG. 3 is an exploded perspective view showing an objective lens driving device for optical pickup according to the present invention.

FIG. 3 is an exploded perspective view showing an objective lens driving device for optical pickup according to an embodiment of the present invention. The objective lens driving device includes an objective lens 301 held by an objective lens bobbin 302, focusing coil 306 and tracking coil 307, and a base plate 317, etc. The objective lens bobbin 302 has protruded parts 314 downwardly projected at its end portions. The tracking coil 307 is wound around an outer periphery of both end portions and the protruded parts 314 of the objective lens bobbin 302. The focusing coil 306 is mounted on the outer side of the tracking coil 307 wound in the protruded parts 314. Accordingly, the focusing coil 306 and the tracking coil 307 are perpendicularly wounded to one another.

In the center of the objective lens bobbin 302 is formed of laser beam pass hole 315 for passing the laser beam. On the laser beam pass hole 315 is installed the objective lens 301 for converging the laser beam. The objective lens 301 is disposed to be opposed to optical disc (not shown). The objective lens bobbin 302 is an U-shaped element which the protruded parts 314 is downwardly bended.

The objective lens bobbin 302 has four suspension through holes 313 symmetrically penetrated and formed from one side wall to the other opposite side wall with respect to the objective lens bobbin 302. The plurality of suspension through holes 313 have a radius of similar size compared to that of the suspensions 303 so that the suspensions 303 are inserted and are fixed.

The base plate 317 indirectly supports the objective lens bobbin 302. The base plate 317 for supporting the objective lens bobbin 302 is U shaped, in which yokes 304a and 304b are perpendicularly disposed on both sides of the support plate 317.

Yokes 304a and 304b may be formed by bending both side of the base plate 317. On one side wall of yokes 304a and 304b are formed through holes 308 so that PCB 310 and the suspensions 303 may be connected to each other, on the other side wall are formed one-end-closed holes 309 (hereinafter called fixed holes) which are connected to the suspensions 303.

PCB 310 is mounted on outer side of yoke 304a. The through holes 308 and the fixed holes 309 are disposed to be opposed to each other on the yokes 304a and 304b. A laser beam pass hole 311 for passing the laser beam is formed on the center part of base plate 317.

Four magnets 305 are mounted on inner side of yokes 304a, 304b. The magnets are disposed to be faced with each other.

Figure 4A:
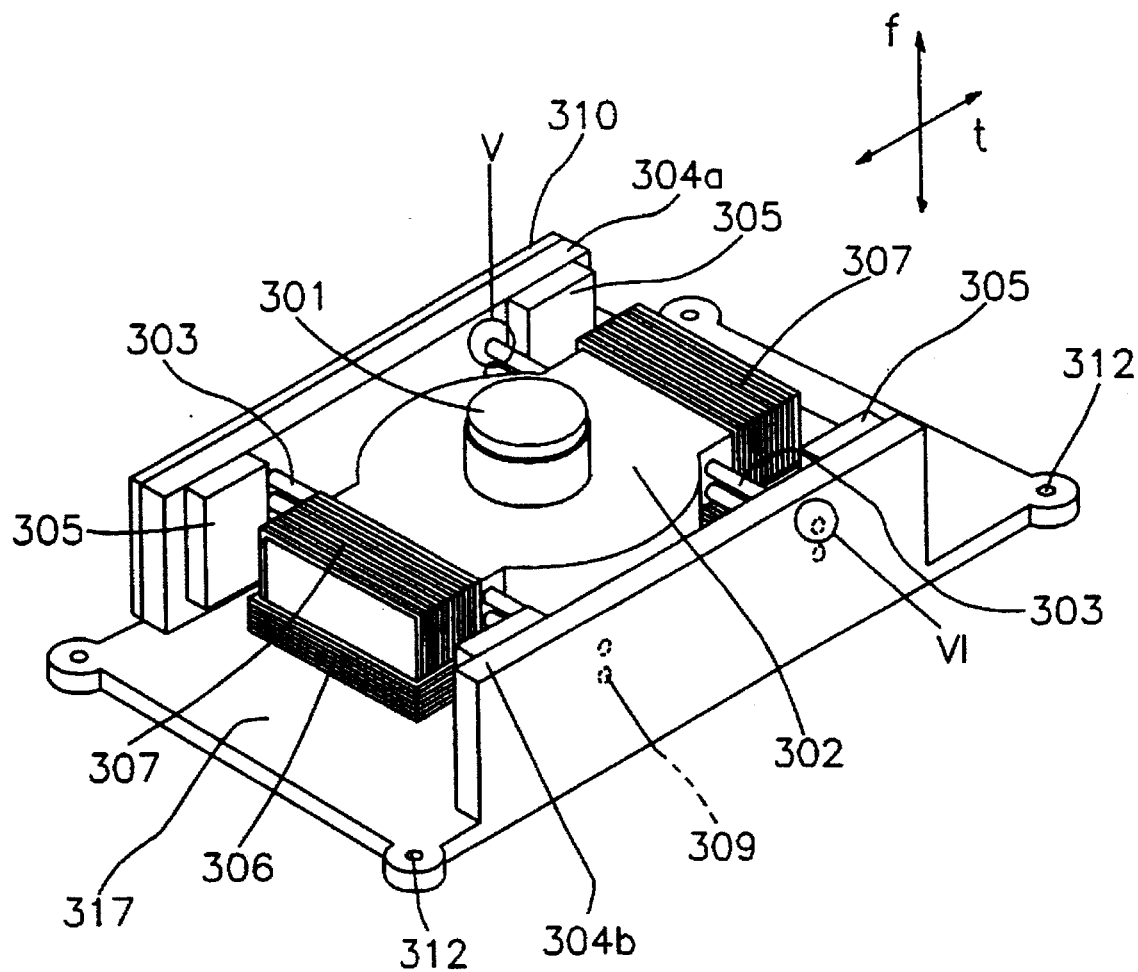
FIG. 4A is a coupled perspective view showing the objective lens driving device shown in FIG. 3.

FIG. 4A is a perspective view of the objective lens driving device for driving the objective lens bobbin 302.

The objective lens 301 is supported by the objective lens bobbin 302. The objective lens bobbin 302 is supported by suspensions 303 connected to yokes 304a and 304b, and then is movable to the focusing and tracking directions.

Both holes 312 are formed in the corners of base plate 317 so that the base plate 317 can be connected to other plate (not shown).

Referring to FIG. 3, the focusing coil 306 and the tracking coil 307 are wound perpendicularly to one another on the end portions of objective lens bobbin 302. Yokes 304a and 304b are formed by bending both side of the base plate 317.

UV adhesives are used to fix the suspension 303 at the entrance of the four suspension through holes 313. The suspensions 313 for supporting the objective lens bobbin 302 are made of P-Sn-Cu wire and they have the same spring constant. The focusing coil 306 and tracking coil 307 are preferably wound to optimum winding ratio for driving the objective lens bobbin 302. The focusing coil 307 is connected to the suspensions 303 for performing focusing and tracking controlling operations.

Figure 4B:
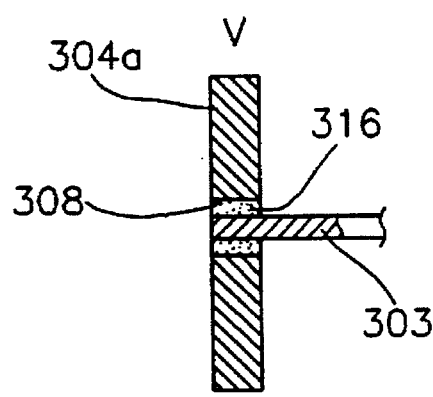
FIG. 4B is a cross-sectional view of yoke 304a including through hole taken along f direction in a circle V in FIG. 4A.

FIG. 4B is a cross-sectional view of yoke 304a including a through hole taken along f direction in a circle V in FIG. 4A. The silicon gel 316 is formed within the through holes 308 of yoke 304a, and the suspensions 303 are supported to the silicon gel 316.

Figure 4C:
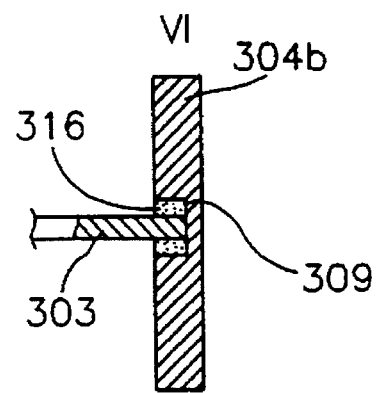
FIG. 4C is a cross-sectional view of yoke 304b including a fixed hole take along f direction in a circle V1 in FIG. 4A.

FIG. 4C is a cross-sectional view of yoke 304b including a fixed hole taken along f direction in a circle V1. The silicon gel 316 is filled to the fixed hole 309 in yoke 304b.

The silicon gel 316 functions to damp undesired vibrations of suspensions 303 occurred in driving the lens bobbin 302, thereby precisely controlling the tracking and focusing operation. As above-described, the plurality of suspensions 303, which are inserted to the through holes 308 and the fixed holes 309, are fixed by the silicon gel 316 filled in the holes of yokes 304a and 304b.

The plurality of suspensions 303 are inserted in the plurality of suspension pass holes 313 formed in side surface of the objective lens bobbin 302. Further, the through holes 308 and the fixed holes 309 are set on straight line to be opposed to one another.

The magnets 305 mounted on inner plane of yokes 304a and 304b are installed to be oppositely faced to the focusing coil 306 and the tracking coil 307. The magnets 305 are preferred to be placed in a predetermined distance on the base plate 317. The objective lens bobbin 302 is placed at a predetermined distance from the base plate 317.

The operation of the objective lens driving device for an optical pickup of the present invention can be more fully described with reference to FIG. 3, and FIGS. 4A to 4C.

When recording and/or reproducing information recorded on the disc, a laser light beam emitted from a semiconductor laser light source (not shown) of an optical pickup is produced, which is passed through the laser beam pass hole 311 formed in the center of the base plate 317 and enters the objective lens 301 through the objective lens bobbin 302.

Then, in recording and/or reproducing of information signals from the optical disc, the light beam emerging from the objective lens 301 is impinged upon the layer of the optical disc. The light beam reflected from the layer of the optical disc is detected by a photodetector (not shown), in which includes a data signal recorded in the optical disc, a tracking error signal for use in tracking servo-control, a focusing error signal for use in focusing servo-control, and other necessary signals are obtained from the photodetector.

In adjusting the tracking and focusing operations, a tracking servo-control circuit and a focusing servo-control circuit (not shown) connected to the photodetector provide focusing coil 306 or tracking coil 307 with the tracking or focusing driving current. Then, an electromagnetic force is generated between focusing coil 306, tracking coil 307 vertically wound to focusing coil 306, and a plurality of magnets 305 mounted on the inner plane of yokes 304a and 304b in accordance with the Fleming's left hand rule.

The current flows into the focusing coil 306 or the tracking coil 307 to thereby drive the objective lens bobbin 302 in the focusing or tracking direction due to the effect of magnetism generated among four magnets 305 attached to yokes 304a and 304b, the focusing coil 306, and the tracking coil 307. When the focusing driving current flows into the focusing coil 306, the electromagnetic force causes the focusing coil 306 to drive the objective lens mounted on the objective lens bobbin 302 in the focusing direction. When driving the objective lens bobbin 302 to the focusing direction, the objective bobbin 302 is supported by means of suspensions 303 disposed at a predetermined distance on the base plate 317 and is driven along an optical axis of the objective lens 301 denoted by an arrow f (the focusing direction) of FIG. 4.

In addition, when the tracking driving current flows into the tracking coil 307, the electromagnetic force causes the tracking coil 307 to drive the objective lens mounted on the objective lens bobbin 302 to the tracking direction. When driving the objective lens bobbin 302 to the tracking direction, the objective lens bobbin 302 supported by suspensions 303 is driven to a vertical direction with respect to the optical axis of the objective lens 301 denoted by an arrow t (the tracking direction) of FIG. 4A.

Furthermore, the objective lens bobbin 302 may be subject to an unexpected vibration, e.g., a vibration occurred between suspensions and yokes 304a, 304b. However, although the vibration of the objective lens bobbin 302 is transmitted to silicon gel 316 via suspensions 303, the transmitted vibration is absorbed by silicon gel 316 formed at through holes 308 and fixed holes 309 of yokes 304a. As a result, the objective lens bobbin 302 achieved the accurate focusing and tracking control of the objective lens 301, thereby preventing the unexpected vibration.

In accordance with the objective lens driving device for the optical pickup according to the present invention, the focusing and tracking coil have an optimum winding ratio at both sides of the objective lens bobbin and the objective lens bobbin is supported by suspensions connected to holes of yokes, thereby resulting in the reduction of the whole weight and the simplification of the structure.

In accordance with the objective lens driving device for the optical pickup according to the present invention, since the plurality of suspensions supporting the objective lens bobbin are connected to silicon gels formed in holes of yokes, the undesirable vibration is rapidly damped, and then the precise focusing and tracking operations of the objective lens is achieved.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An objective lens driving device for an optical pickup comprising:

an objective lens bobbin including an objective lens having an optical axis and having a plurality of pass holes formed on both side walls of said objective lens bobbin;

a plurality of suspensions for supporting said objective lens bobbin; and a base plate including a pair of yokes disposed on sides of said base plate, said yokes being opposite each other and having a plurality of through holes on one yoke and a plurality of fixed holes on the other yoke to be connected with said plurality of suspensions;

wherein said plurality of suspensions are fitted to said plurality of pass holes of said objective lens bobbin, thereby supporting said objective lens bobbin.

2. The objective lens driving device according to claim 1, wherein said yokes and said base plate are integratedly formed.

3. The objective lens driving device according to claim 1, further comprising a focusing coil and a tracking coil, said focusing coil and said tracking coil being vertically wound to each other at both end portions of said objective lens bobbin.

4. The objective lens driving device according to claim 1, further comprising a plurality of magnets, said plurality of magnets being attached to inner sides of said yokes.

5. The objective lens driving device according claim 1, wherein each suspension is a wire.

6. The objective lens driving device according to claim 1, further comprising means for damping a vibration transmitted to said suspensions in said through holes and fixed holes.

7. The objective lens driving device according to claim 6, wherein said damping means is a silicon gel.

8. An objective lens driving device for an optical pickup comprising, an objective lens bobbin including an objective lens having an optical axis, a focusing coil and a tracking coil, said focusing coil and said tracking coil being vertically wound to each other at both end portions of said objective lens bobbin, and having a plurality of pass holes formed on both side walls of said objective lens bobbin;

a plurality of suspensions for supporting said objective lens bobbin;

a base plate including a pair of yokes disposed on sides of said base plate, said yokes being opposite each other and having a plurality of through holes on one yoke and a plurality of fixed holes on the other yoke to be connected with said plurality of suspensions; and damping means for damping vibration of said plurality of suspensions within said through holes and said fixed holes, wherein said plurality of suspensions are fitted to said plurality of pass holes of said objective lens bobbin, thereby supporting said objective lens bobbin.

* * * * *